US007013116B2

(12) United States Patent
Ashikhmin et al.

(10) Patent No.: US 7,013,116 B2
(45) Date of Patent: Mar. 14, 2006

(54) MIMO SYSTEMS HAVING A CHANNEL DECODER MATCHED TO A MIMO DETECTOR

(75) Inventors: Alexei Ashikhmin, Morristown, NJ (US); Gerhard Guenter Theodor Kramer, Bedminster, NJ (US); Stephan Ten Brink, Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 440 days.

(21) Appl. No.: 10/180,727

(22) Filed: Jun. 26, 2002

(65) Prior Publication Data

US 2004/0002309 A1    Jan. 1, 2004

(51) Int. Cl.
   *H04B 1/16* (2006.01)
(52) U.S. Cl. ............... 455/214; 455/337; 455/278.1; 375/340; 375/267
(58) Field of Classification Search ............... 455/214, 455/296, 337, 295, 101, 278.1, 272; 375/340, 375/341, 267; 370/206; 714/795, 796
   See application file for complete search history.

(56) References Cited

U.S. PATENT DOCUMENTS

| 6,581,182 B1 * | 6/2003 | Lee ............................. 714/795 |
| 2002/0154712 A1 * | 10/2002 | Cideciyan et al. .......... 375/341 |
| 2003/0076890 A1 * | 4/2003 | Hochwald et al. .......... 375/264 |
| 2003/0103584 A1 * | 6/2003 | Bjerke et al. ................ 375/340 |
| 2003/0235149 A1 * | 12/2003 | Chan et al. .................. 370/206 |

OTHER PUBLICATIONS

S. Benedetto, et al., "Serial Concatenation of Interleaved Codes: Performance Analysis, Design, and Iterative Decoding", IEEE Transactions on Information Theory, vol. 44, No. 3, pp. 909-926, May 1998.
T. J. Richardson, et al., "The Capacity of Low-Density Parity-Check Codes Under Message-Passing Decoding", IEEE Transactions on Information Theroy, vol. 47, No. 2, pp. 599-618, Feb. 2001.
S. ten Brink, "Convergence of Iterative Decoding", Electronics Letters, vol. 35, No. 10, pp 806-808, May 13, 1999.

* cited by examiner

*Primary Examiner*—Edward F. Urban
*Assistant Examiner*—Blane J. Jackson
(74) *Attorney, Agent, or Firm*—Irena Rappaport; Donald P. Dinella

(57) ABSTRACT

A method and apparatus for reducing the number of erred bits in the decoded signal by using a channel decoder whose transfer characteristic is matched to the transfer characteristic of the MIMO detector. This means that the curve of the transfer characteristic of the MIMO detector is 1) above the curve of the reflected transpose of the transfer characteristic of the channel decoder for about 95% of the curve, and 2) close to the reflected transpose of the curve of the transfer characteristic of the channel decoder. Particularly, an LDPCC decoder can be used as the channel decoder and can be matched to the MIMO detector by matching 1) the transfer characteristic of the LDPCC decoder's CND to 2) the transfer characteristic of a combination of the MIMO detector and the LDPCC VND. Furthermore, the LDPCC can be similarly matched to any appropriate detector in addition to or instead of the MIMO detector. Additionally, a receiver can re-match the transfer characteristics of the detector and the channel decoder when the channel characteristics and/or SNR of the received signals change.

15 Claims, 11 Drawing Sheets

200

MIMO SYSTEMS HAVING A CHANNEL DECODER MATCHED TO A MIMO DETECTOR

BACKGROUND OF THE INVENTION

This invention relates to wireless communication systems, and more particularly, to wireless communication systems using multiple antennas at the transmitter and receiver.

Wireless communication systems that use multiple antennas at the transmitter and multiple antennas at the receiver, so-called multi-input multi-output (MIMO) systems, can achieve dramatically improved capacity compared to single antenna systems, i.e., systems that have a single antenna at the transmitter and a single antenna at the receiver. As shown in FIG. 1, at transmitter 120 of a MIMO wireless communication system 100, primitive data stream 130 (i.e., the data stream to be transmitted) is processed, using well-known techniques, to form space-time coded signals. Particularly, transmitter 120 divides the primitive data stream into data sub-streams. The data sub-streams are channel encoded, interleaved in space and time, and multiplexed onto the transmit antennas to produce the space-time coded signals. Typically, each of the space-time coded signals is transmitted over a different one of the transmit antennas 115-1, 115-2, 115-3, and 115-4.

The signals emanating from the transmit antennas arrive at receive antennas 125-1 and 125-2. The received signal at each of the receive antennas is typically a superposition of each of the transmitted signals. Though the transmitted signals interfere with each other, received signals are processed in receiver 140 to separate out and then decode these superpositioned signals.

In a receiver that uses iterative decoding, such as the one shown in FIG. 1, the received signal is processed in MIMO detector 150 and channel decoder 155 several times to reduce the number of bit errors in the decoded signal. First the symbols of the received signals are processed in MIMO detector 150. MIMO detector 150 processes the received signals received over receive antennas 125-1 and 125-2, one vector symbol at a time, to determine the individual transmitted signals. (A vector symbol is a vector, each of whose components is a symbol received on one of the receive antennas during the same symbol period; a symbol period being a time period whose duration is one symbol.) During the processing of the symbols, MIMO detector 150 also digitally demodulates the signals, i.e. maps them from symbol space into bit space, to obtain soft value bits. Soft value bits are bits whose value conveys both whether the bit is a one or zero and an indication of the certainty with which this is known. A block of the soft value bits is deinterleaved in deinterleaver 152 and then processed in channel decoder 155. (At output 162 of channel decoder 155, the values of the soft value bits are just their values as decoded by channel decoder 155 on the last pass through. That is their values at the input of the channel decoder are, for example subtracted out.) The soft value bits as decoded by channel decoder 155 are interleaved in interleaver 157 and fed back as an input to MIMO detector 150 to again process the bits using the new values of the soft value bits. (Similarly to channel decoder 155, MIMO detector 150 includes subtraction operation to obtain the values of the soft value bits as detected by MIMO detector 150.) The processing of the soft value bits in the MIMO detector using the values obtained from their last pass through the channel decoder, and visa versa is repeated several times. The resulting bits at output 162 include both their values as decoded by channel decoder 155 on this last pass through and the values of the soft value bits at the input of the channel decoder. The resulting bits can be further processed in receiver 140, such as by, for example, demultiplexing them, to obtain reconstructed primitive data stream 195.

The channel coding is used for error correction. That is, the channel decoder may be able to recover bits that arrive at the receiver in error due to noise and/or interference. Conventionally, a strong channel code, such as a turbo code, is used. (A strong channel code is one that in most environments can achieve either 1) the same bit error rate at a lower signal-to-noise ratio as a weaker code that has the same redundancy or 2) a reduced bit error rate at the same signal-to-noise ratio as a weaker code that has the same redundancy.) In single antenna systems an increase in the strength of the code typically results in a decrease in the number of erred bits in the decoded signal. However, recent research has shown that an increase in the strength of the channel code does not necessarily result in a reduction in the errors in the decoded signal at the receiver when the number of antennas at the transmitter is larger than the number of antennas at the receiver.

SUMMARY OF THE INVENTION

The present inventors have recognized that it is possible to decrease the bit error rate of the decoded signal based on the transfer characteristic of the channel decoder. The transfer characteristic of a decoding device, such as MIMO detector or channel decoder, is the certainty with which soft value bits are known at the output of the device using the information known about the bits at the input of the device. In a receiver that includes both a MIMO detector and a channel decoder, the number of erred bits in the decoded signal is determined, in part, by the relationship between the transfer characteristics of the MIMO detector and channel decoder.

Particularly, the present inventors have recognized that the number of erred bits in the decoded signal can be reduced by using a channel decoder whose transfer characteristic is matched to the transfer characteristic of the MIMO detector. The transfer characteristic of the channel decoder is referred to herein as being matched to that of the MIMO detector when the curve (as defined immediately below) of the transfer characteristic of the MIMO detector is 1) above the curve of the reflected transpose of the transfer characteristic of the channel decoder for about 95% of the curve, and 2) close to, i.e. within a threshold difference of, the reflected transpose of the curve of the transfer characteristic of the channel decoder. As referred to herein, the reflected transpose of a curve is a reflection of the curve across the principal diagonal through the origin whose slope is one. The curve of the transfer characteristic of a decoding device is the extrinsic certainty with which the soft value bits are known at the output of the device determined as a function of the certainty with which they are known at the input of the device. The certainty can be expressed as the mutual information content (as defined further in the detailed description) of the soft value bits. As referred to herein the curve of the transfer characteristic of a decoding device is the extrinsic mutual information content of the soft value bits at the output of the device determined as a function of their mutual information content at the input of the device. The threshold difference between the curves of the transfer characteristics of the MIMO detector and channel decoder as used in condition 2 above can be measured in terms of the distance between the MIMO detector's transfer characteristic curve and the reflected transpose of the channel decoder's transfer characteristic curve. Preferably, this distance is minimized, so that one curve overlays the other, although the area between the two curves can be greater, for example, when the two curves are plotted on a scale from 0 to 1 the distance between the two curves can be up to 0.05 and still be within the scope of the invention.

In an embodiment of the invention, a receiver has a MIMO detector and a channel decoder, and the channel decoder's transfer characteristic is matched to that of the MIMO detector. In another embodiment of the invention, a wireless communication system dynamically selects the channel code used to transmit signals based upon the transfer characteristic of the decoder used to decode the channel code. Particularly, a channel code whose decoder's transfer characteristic is matched to the transfer characteristic of the MIMO detector is selected. Using a channel decoder whose transfer characteristic is matched to the transfer characteristic of the MIMO detector allows for a reduction in the bit error rate of the decoded signal when the signal-to-noise ratio remains the same, or it allows for the receiver to decode the a signal received at a lower signal-to-noise ratio without increasing the bit error rate. As is well known in the art, reducing the bit error rate of the decoded signal produces many advantages in a wireless communication system, including increasing its capacity.

The present inventors have recognized that it is advantageous to use low density parity check codes (LDPCCs) as channel codes in a system where the receiver has a MIMO detector, particularly when the number of transmit antennas is larger then the number of receive antennas. LDPCCs can be adjusted to change their decoding properties to obtain a LDPCC decoder whose transfer characteristic is matched to the transfer characteristic of a MIMO detector.

More particularly, the present inventors have recognized that it is possible to decrease the bit error rate of a decoded signal by matching 1) the transfer characteristic of a check node decoder (CND) of the LDPCC decoder and 2) the transfer characteristic of a combination of a detector and a variable node decoder (VND) of the LDPCC decoder. A LDPCC comprises parity check equations that are used to encode data in accordance with a parity check matrix. A LDPCC decoder includes a CND, which decodes the parity check equations, and a VND, which ensures that each bit being decoded is processed in an appropriate number of parity check equations. The detector, of 2 above, can be any appropriate type of detector, such as, for example, a MIMO detector, which detects symbols transmitted concurrently over multiple transmit antennas, or the detector can be an equalizer, which detects symbols that have interfered with each other in time, i.e. intersymbol interference.

In another aspect of the invention, the present inventors have recognized a method for adjusting and/or selecting the LDPCCs by matching the transfer characteristics of the CND to those of the VND. The transfer characteristic of the CND are referred to herein as being matched to those of the VND when the curve of the transfer characteristic of the VND is 1) above the curve of the reflected transpose of the transfer characteristic of the CND for about 95% of the curve, and 2) close to, i.e. within a threshold difference of, the reflected transpose of the curve of the transfer characteristic of the CND.

Matching the transfer characteristic of the CND to the transfer characteristic of the VND is a convenient and computationally practical method of selecting a LDPCC.

The figures are not drawn to scale and illustrate the interconnectivity of the depicted systems and not necessarily their spatial layout and physical dimensions.

DETAILED DESCRIPTION OF ILLUSTRATIVE EMBODIMENTS

Figure 2:
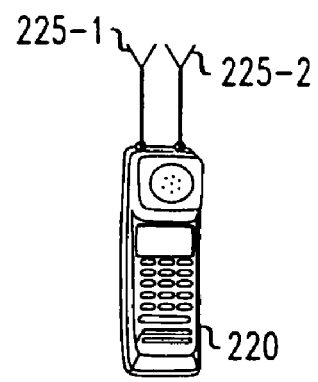
FIG. 2 illustrates, according to an embodiment of the present invention, a portion of a wireless communication systems that has a base station with multiple transmit antennas and a mobile terminal with multiple receive antennas.
Figure 2:
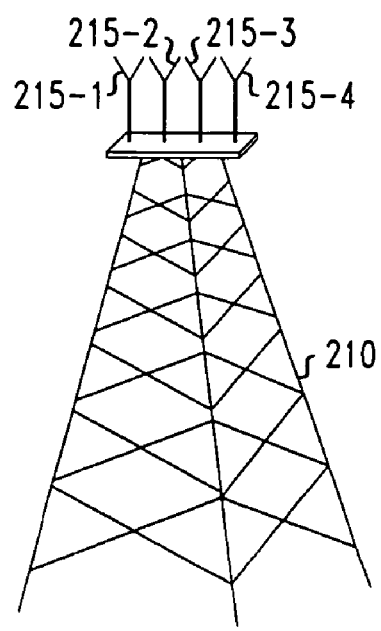
Figure 3:
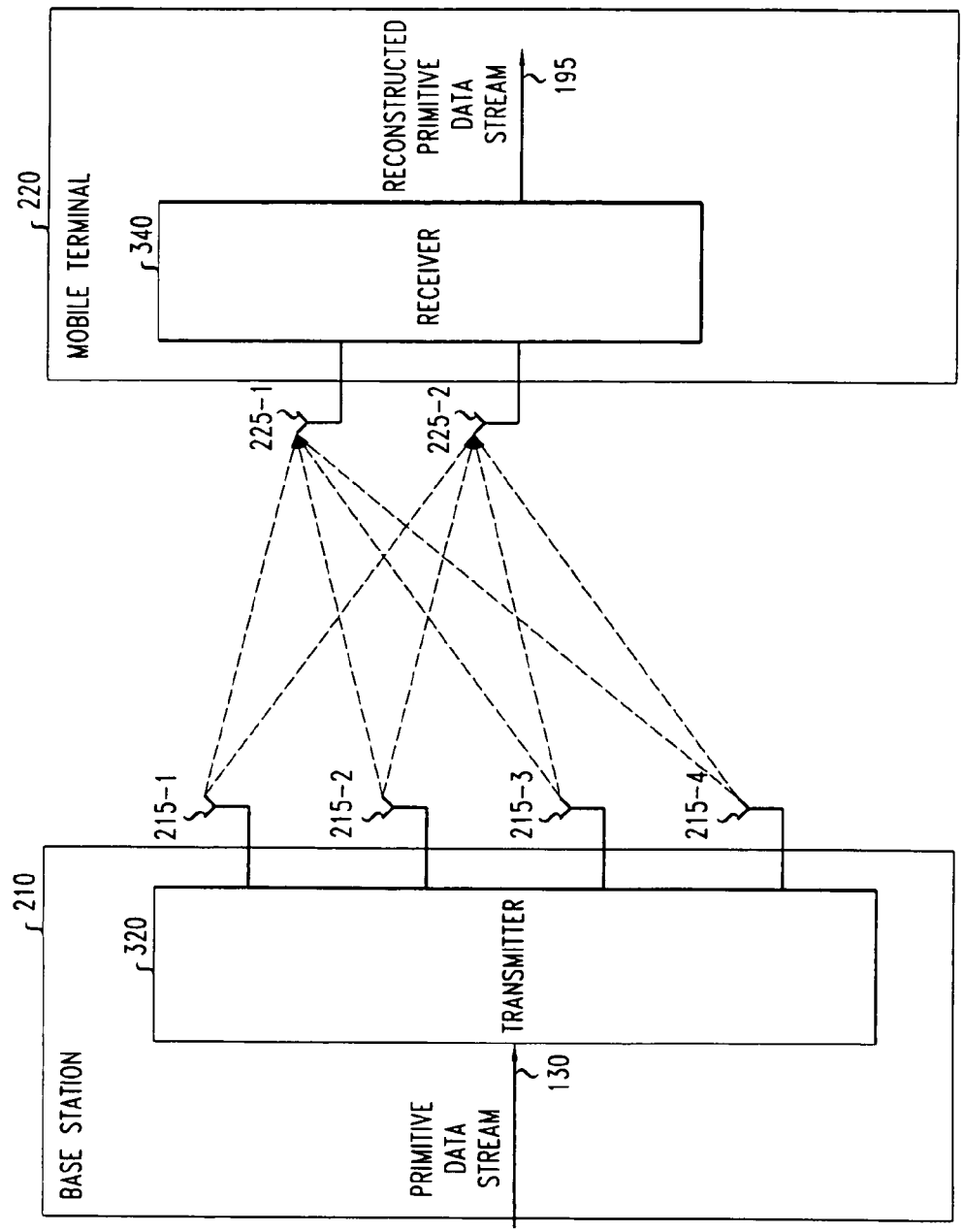
FIG. 3 illustrates in more detail a portion of the base station and mobile terminal of FIG. 2.

FIG. 2 shows a portion of wireless communication system 200. The wireless communication system includes base station 210 and mobile terminal 220. The size of base station 210 is significantly larger than that of mobile terminal 220 and thus more antennas can be placed at the base station than at the mobile terminal. This is especially true when mobile terminal 220 is a mobile telephone, as shown in the illustrative embodiment of FIG. 2. Typically, both mobile terminal 220 and base station 210 have both a transmitter and a receiver. Therefore, the number of transmit antennas 215-1, 215-2, 215-3, and 215-4 at base station 210's transmitter 320 (shown in FIG. 3) is typically larger than the number of receive antennas 225-1, and 225-2 at mobile telephone 220's receiver 340 (shown in FIG. 3). Furthermore, because of a MIMO system's capacity increase, it is very useful for transmitting data. Often, it is more desirable to be able to receive data at a mobile terminal, for example, to be able to download information from a server, than it is to transmit data from the mobile terminal. Thus, the scenario where the number of antennas at the transmitter is larger than the number of antennas at the receiver is important in current wireless communication systems. However, as described above, recent research has shown that, when the number of antennas at the transmitter is larger than the number of antennas at the receiver the conventional method of decreasing the bit error rate by increasing the strength of the channel code does not work well. When the number of antennas at the transmitter is larger than the number of antennas at the receiver, an increase in the strength of the channel code does not necessarily produce a reduction in the errors in the decoded signal at the receiver.

The present inventors have recognized that it is possible to decrease the bit error rate of the decoded signal by using a channel decoder whose transfer characteristic is matched to the transfer characteristic of the MIMO detector. As referred to herein, the transfer characteristic of a decoding device, such as a MIMO detector or a channel decoder, is the mutual information content of the soft value bits at the output of the device determined as a function of the mutual information content of these bits at the input of the device.

The mutual information content of soft value bits is a value for expressing the information content of bits, in this case of the coded bits, i.e. the bits produced by a transmitter's coding process. The mutual information content is plotted on a scale of 0 to 1. For example, a mutual information content of: 0 means that no information is known about the bits and an infinite number of bits is needed to convey one bit accurately, 1 means that bits are known with 100% certainty so only 1 bit is needed to convey one bit accurately, and values in between mean that $$\frac{1}{\text{the mutual information content}}$$

is the smallest number of bits needed to convey one bit the mutual information content accurately, so for example, 0.2 means that the bits are known with enough certainty so that at least 5 bits are needed to convey one bit accurately.

Figure 1:
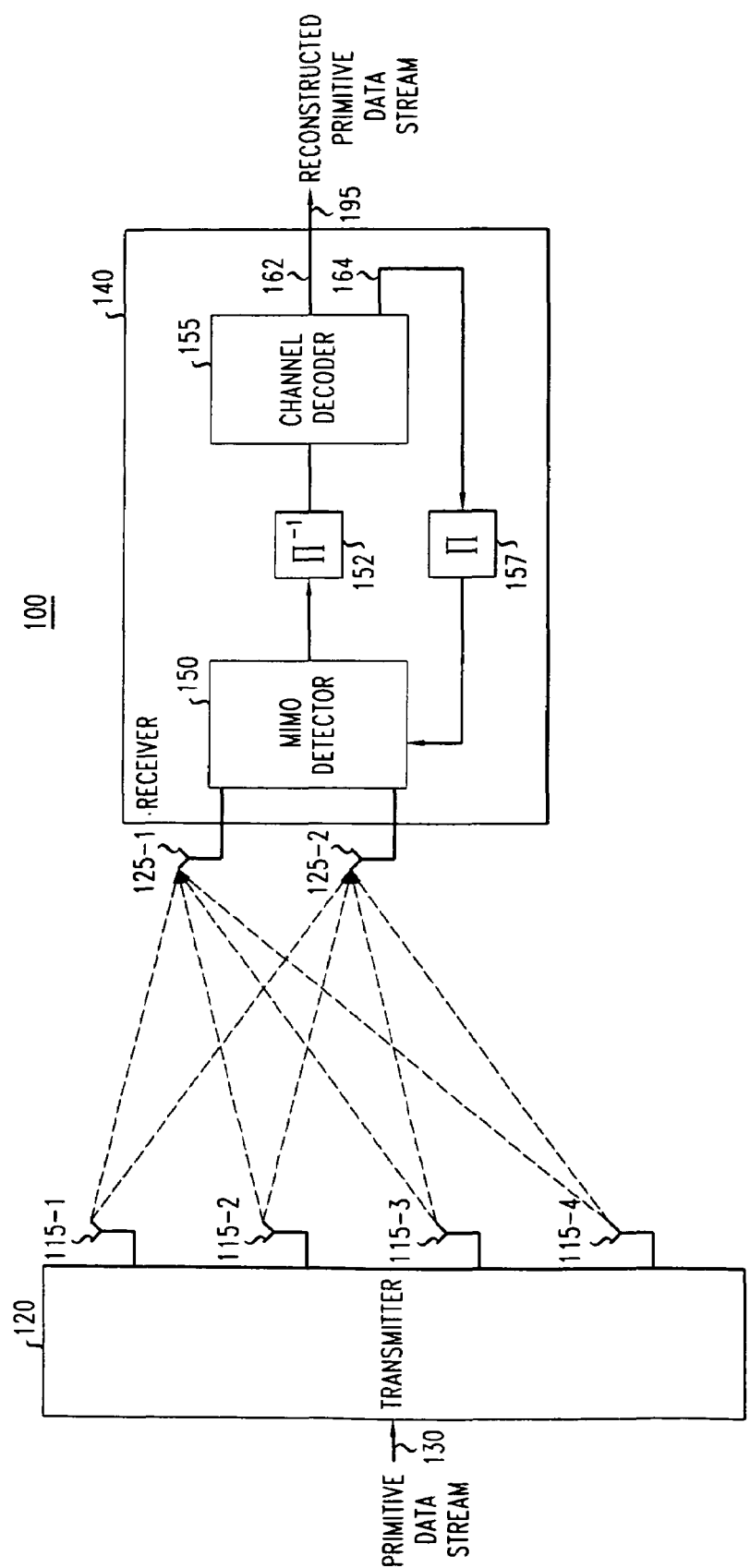
FIG. 1 illustrates a portion of a wireless communication system where a transmitter having multiple transmit antennas is communicating with a receiver having multiple receive antennas.
Figure 4:
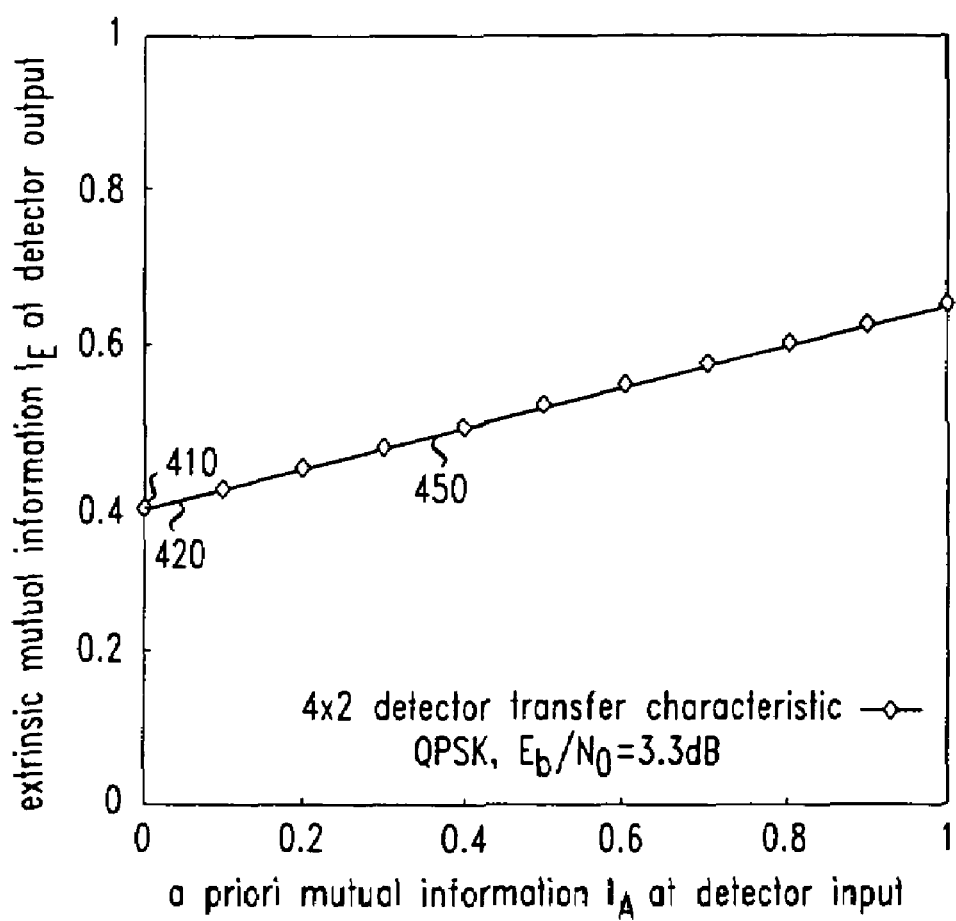
FIG. 4 is a curve of the transfer characteristic of a MIMO detector.

The curve of the transfer characteristic of a MIMO detector is now first described with respect to the operation of a conventional receiver shown in FIG. 1, and then the curve is described with respect to the operation of a receiver in accordance with an embodiment of the invention. FIG. 4 shows a curve of the transfer characteristic of MIMO detector 150, shown in FIG. 1, where MIMO detector 150 is a 4×2 detector, meaning that the detector is designed to decode signals transmitted over 4 transmit antennas and received over 2 receive antennas, and where the normalized signal-to-noise ratio is 3.3 dB. (Note, typically, the measured signal-to-noise ratio at the receiver is expressed as the signal-to-noise ratio of the coded bits. The normalized signal-to-noise ratio is the signal-to-noise ratio of the information bits, i.e. the bits of the primitive data stream, where each information bit is represented by a certain number of coded bits. The number of coded bits that represent an information bit is specified by the redundancy of the code.) The y-axis of FIG. 4 is the extrinsic mutual information content with which the soft bits are known at the output of MIMO detector 150, and the x-axis is the mutual information content with which these bits are known at the input of the MIMO detector. Both axes go from 0 to 1, so the mutual information content is plotted form on a scale of 0 to 1, as described in the previous paragraph. As the block of bits is iteratively decoded by the MIMO detector and the channel decoder, the mutual information increases with each iteration. So, up to a point, as the values of the soft value bits become known with more certainty (i.e. as the mutual information content increases) the MIMO detector and channel decoder are able to decode the soft value bits with even more certainty (i.e. a higher mutual information content) in the next iteration. At a certain point the extrinsic mutual information content (on the y-axis) may not increase further because regardless of the quality of the input information the decoder can only achieve so much certainty. (As used herein, the term extrinsic mutual information content means that the input that represents the mutual information content of the $k^{th}$ term is not used in determining the mutual information content of the output of the $k^{th}$ term, as explained in more detail with respect to equations 1 and 2.)

Typically, when the soft value bits are processed by MIMO detector 150 for the first time, MIMO detector 150 does not know any information about them (0 on the x-axis) and MIMO detector 150 decodes the bits with a mutual information content of 0.39 (0.39 on the y-axis). Thus, this first pass through the MIMO detector produces point 410 (0, 0.39) of curve of the transfer characteristic of MIMO detector 150. As described above with respect to the operation of receiver 140, the soft value bits are deinterleaved in deinterleaver 152 and then passed to channel decoder 155. Channel decoder 155 uses the information provided to it by the MIMO detector to decode the soft value bits. For the case where channel decoder 155 is a turbo decoder, the turbo decoder is able to decode the other bits in the block with a mutual information content of 0.05. The new information learned about the bits in channel decoder 155 is interleaved in interleaver 157 and fed back as an input to MIMO detector 150 to again process the bits using the soft value bits as decoded by channel decoder 155. So now MIMO detector 150 knows the soft value bits with a mutual information content of 0.05 (0.05 on the x-axis) and MIMO detector 150 uses this information to decode the soft value bits to obtain a mutual information content of 0.4 (0.4 on the y-axis). And so the second pass through the MIMO detector produces point 420 (0.05, 0.4) of the curve of the transfer characteristic of MIMO detector 150. This process is repeated several times, producing curve 450.

Figure 9:
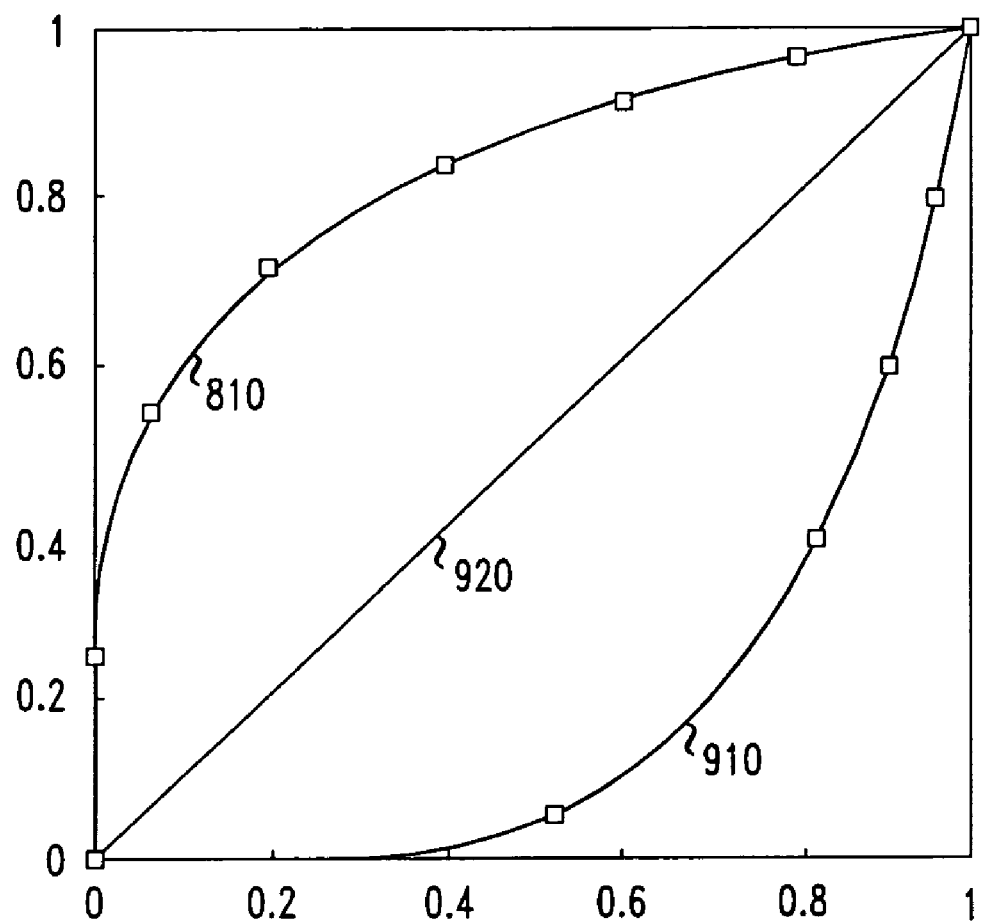
FIG. 9 illustrates a curve (particularly a CND curve) and its reflected transpose.
Figure 10:
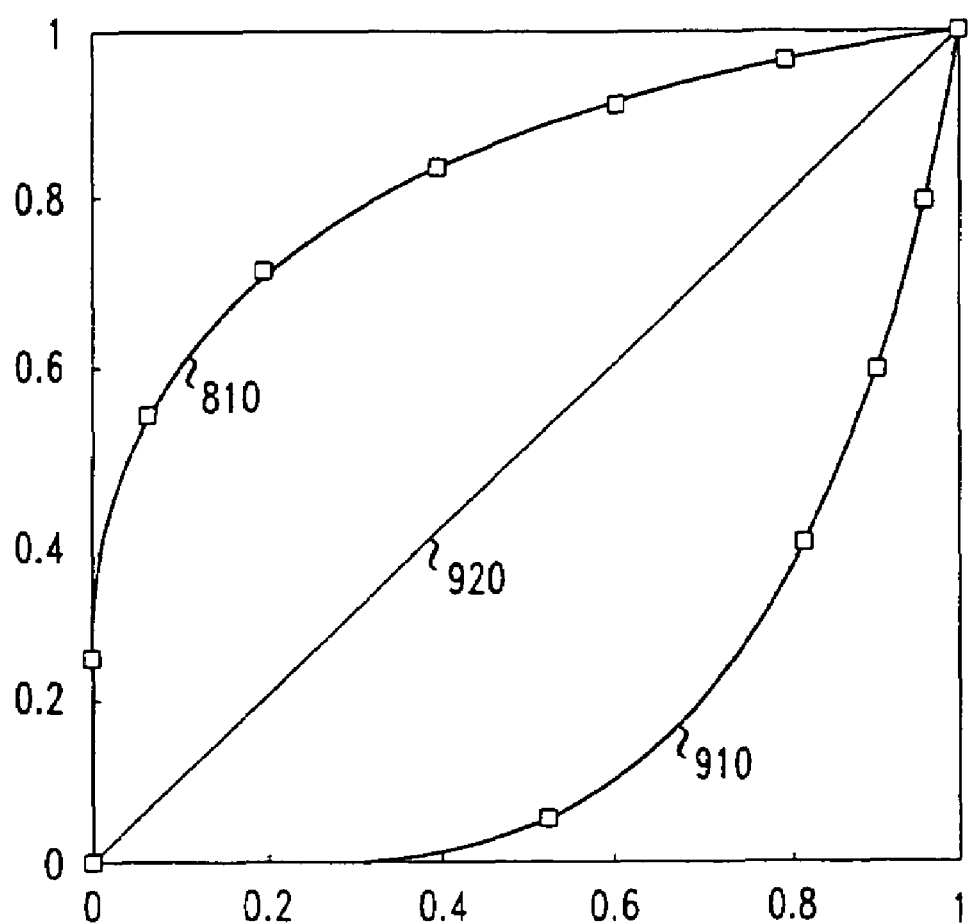

The transfer characteristic of a first device, such as the channel decoder, is referred to herein as being matched to the transfer characteristic of a second device, such as MIMO detector 150 when the curve of the transfer characteristic of the second device, for example curve 450 is 1) above the curve of the reflected transpose of the transfer characteristic of the first device, i.e., the channel decoder, for at least the lower 95% of the curve and 2) close to, i.e. within a threshold difference of, the reflected transpose of the curve of the transfer characteristic of the first device, i.e., the channel decoder. As referred to herein, the reflected transpose of a curve is a reflection of the curve across the principal diagonal through the origin whose slope is one. The lower 95% of a curve is 0 to 0.95 on the x-axis. Thus, condition 1 allows the curves to cross at points whose x-coordinate is about 0.95 or higher. (Condition 2 can be expressed equivalently as: the curve of the transfer characteristic of the first device, i.e. the channel decoder is within a threshold difference of the reflected transpose of the curve of the transfer characteristic of the second device, i.e. MIMO detector. In this equivalent case, curve 450 would be below the curve of the transfer characteristic of the channel decoder for points on the y-axis from 0 to 0.95.) (FIG. 9 illustrates a curve and its reflected transpose. Curve 910 is the curve of transfer characteristic of a CND. Line 920 is the principal diagonal through the origin whose slope is one. Every point of curve 910 is reflected through line 920 to produce curve 810, which is the curve of the reflected transpose of curve 910.)

The threshold difference of condition 2 above can be measured in terms of the distance between the MIMO detector's transfer characteristic curve and the reflected transpose of the channel decoder's transfer characteristic curve. Preferably, this distance is minimized, so that one curve overlays the other, although the area between the two curves can be greater, for example, when the curves are plotted on a scale of 0 to 1, the threshold difference can be up to 0.05 and still be within the scope of the invention.

Figure 5:
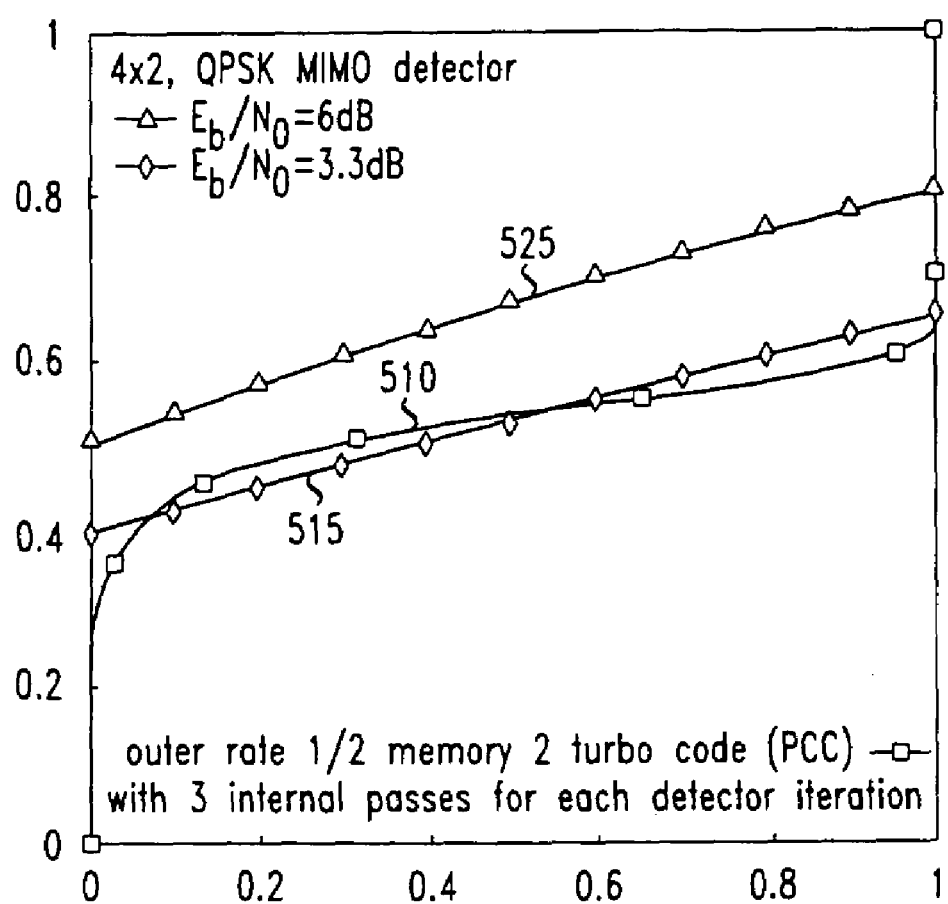
FIG. 5 illustrates curves of the transfer characteristic of a MIMO detector and a reflected transpose of the curve of the transfer characteristic of a turbo decoder.

FIG. 5 shows the curve of the transfer characteristic of MIMO detector 150 and the channel decoder 155, shown in FIG. 1. As can be seen from FIG. 5, when the normalized signal to noise ratio is 3.3 dB, curve 510 of the reflected transpose of the transfer characteristic of channel decoder 155 crosses curve 515 of the channel characteristic of MIMO detector 150 near 0.6 on the x-axis, thus not meeting condition 1 above. When the normalized signal to noise ratio is 6 dB, curve 510 of the transfer characteristic of channel decoder 155 is far from curve 525 of the channel characteristic of MIMO detector 150, thus not meeting condition 2 above.

Figure 6:
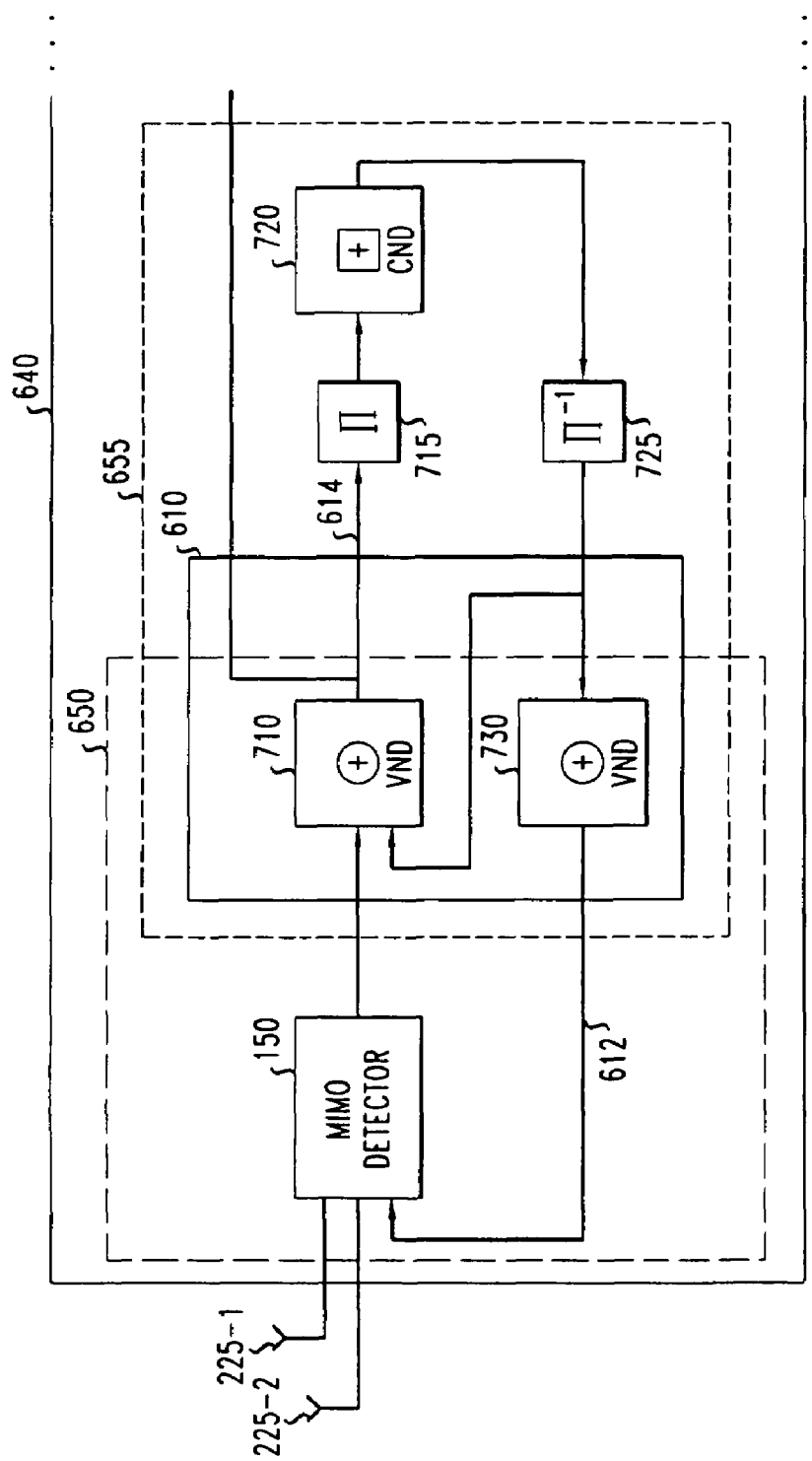
FIG. 6 illustrates a portion of the receiver of FIG. 1 having a MIMO detector and an LDPCC decoder in accordance with an embodiment of the invention.

FIG. 6 shows an embodiment of the invention where receiver 640 has channel decoder 655 whose transfer characteristic is matched to the transfer characteristic of MIMO detector 150. Channel decoder 655 is a LDPCC decoder. The present inventors have recognized that LDPCCs can be adjusted to change their decoding properties to obtain a LDPCC decoder whose transfer characteristic is matched to the transfer characteristic of a MIMO detector. The transfer characteristic of a LDPCC decoder can be matched to the transfer characteristic of a MIMO detector by matching 1) the transfer characteristic of the check node decoder (CND) of the LDPCC decoder and 2) the transfer characteristic of the combination of a detector and the variable node decoder (VND) of the LDPCC decoder.

Figure 7A:
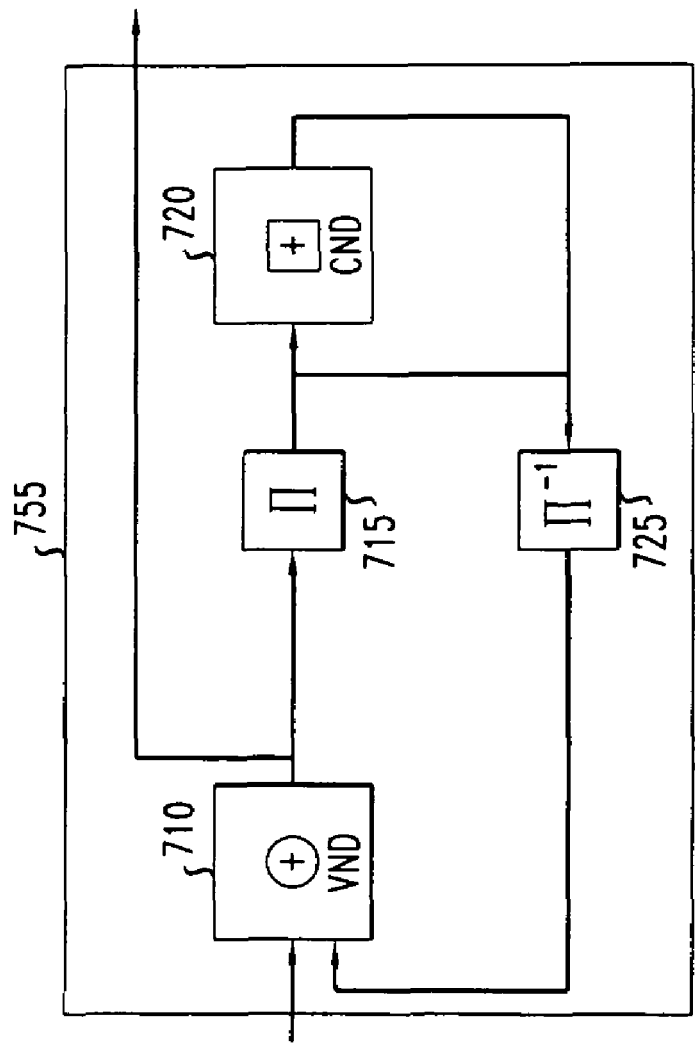
FIG. 7A illustrates a LDPCC decoder.
Figure 7B:
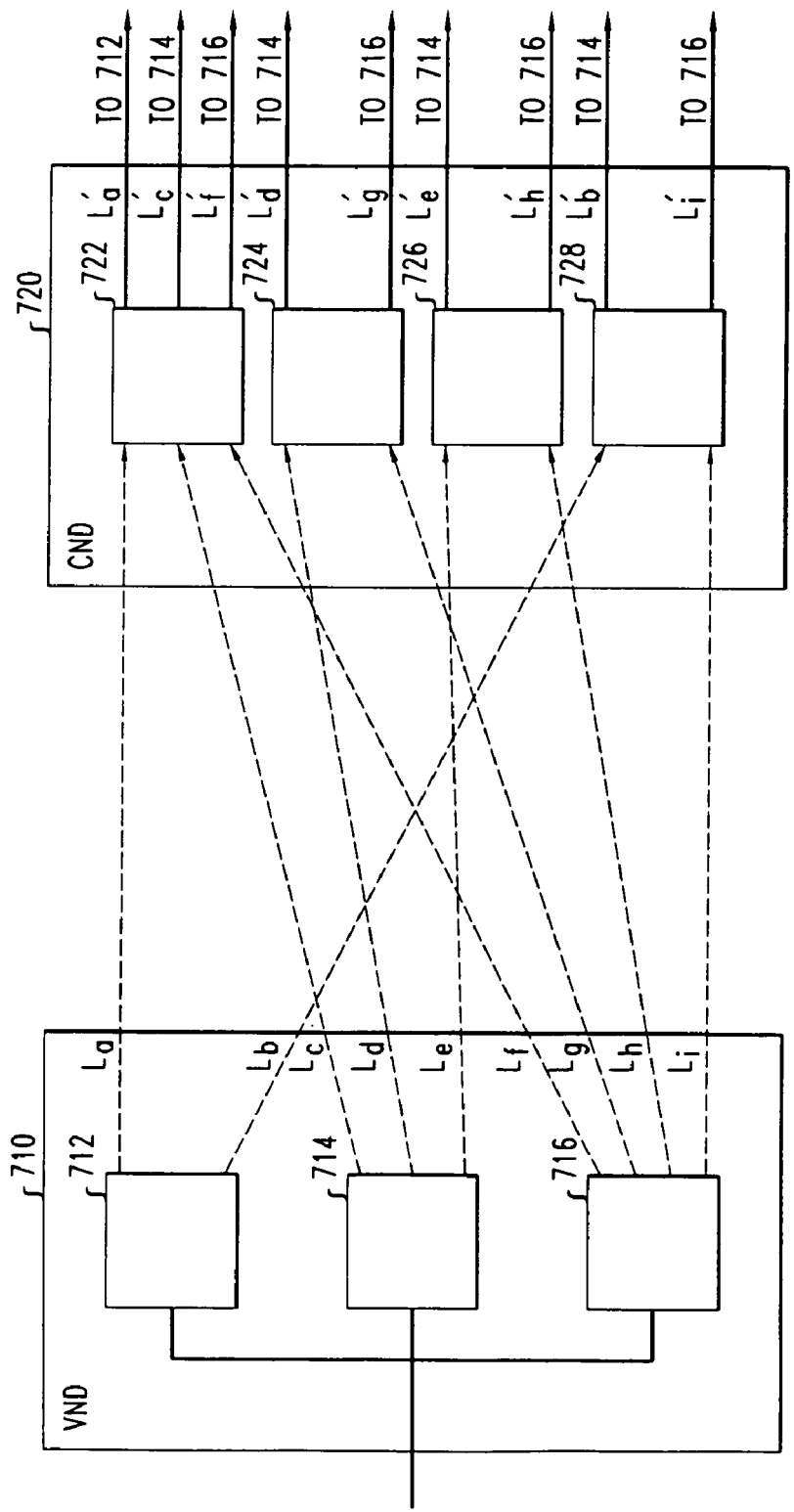
FIG. 7B illustrates in more detail the operation of the CND and VND of the LDPCC decoder of FIG. 7A.

The LDPCC and LDPCC decoder will now be briefly explained with reference to FIGS. 7A and 7B, before returning to the use of the LDPCC decoder in the embodiment shown in FIG. 6. LDPCC coding is performed in accordance with a parity check matrix. An LDPCC has parity check equations that are used to encode data in accordance with a parity check matrix. In LDPCC decoder 755, the input of the LDPCC decoder is also decoded in accordance with the parity check matrix. LDPCC decoder 755 includes a check node decoder (CND 720), and a variable node decoder (VND) 710, both of which have degrees. CND degrees define how many different soft value bits are involved in any particular parity check equation. Each soft value bit is used in one or more parity check equations. VND degrees define how many parity check equations a particular soft value bit is used in. Both the CND and the VND can have either one or multiple degrees. CND 720 is made up of check nodes, each of which decodes one of the parity check equations. For example, if the CND has two different degrees of 2 and 3 and the VND has three different degrees of 2, 3, 4, then some parity check equations involve 2 bits and are decoded in check nodes 724 (bits corresponding to messages $L_d$ and $L_g$), 726 (bits corresponding to messages $L_e$ and $L_h$), and 728 (bits corresponding to messages $L_b$ and $L_i$), as shown in FIG. 7B, and parity check equations involve 3 bits and are decoded in check node 722 (bits corresponding to messages $L_a$, $L_c$, and $L_f$). VND 710 is made up of variable nodes, each of which produces a number of messages to the CND with each representing one of the soft value bits. The number of messages produced by a particular variable node depends on its degree. So when the VND has three different degrees of 2, 3, 4, then: variable node 712 produces 2 messages ($L_a$ and $L_b$) each corresponding to (as will be described with reference to equation 2 below) a first soft value bit that is used in 2 parity check equations; variable node 714 produces 3 messages ($L_c$, $L_d$, and $L_e$) each corresponding to a second soft value bit that is used in 3 parity check equations; and variable node 716 produces 4 messages ($L_f$, $L_g$ $L_h$, and $L_i$) each corresponding to a third soft value bit that is used in 4 parity check equations. Thus, the LDPCC structure is very flexible, and, as opposed to turbo codes, has many parameters (i.e. CND and VND degrees) that can be selected to adjust the properties of the LDPCC, and the LDPCC decoder.

In operation, the soft value bits are input into LDPCC decoder 755. On the first pass through the LDPCC decoder, the soft value bits pass through VND 710, with the VND generating messages each of which is a copy of the soft value bit at its input. The outputs of VND 710 are interleaved in interleaver 715 and are processed in CND 720. CND 720 calculates a posteriori log-likelihood ratios for each of the messages in accordance with equation 1, where $L_k$ is the output of CND 720 for the $k^{th}$ message.

$$L_k = \ln \frac{1 - \prod_{\substack{j=1, \\ j \neq k}}^{d_{CN}} \frac{1 - e^{L_j}}{1 + e^{L_j}}}{1 + \prod_{\substack{j=1, \\ j \neq k}}^{d_{CN}} \frac{1 - e^{L_j}}{1 + e^{L_j}}} \quad (1)$$

where $d_{CN}$ is the degree of the check node to which the $k^{th}$ message is directed, $L_j$ is the input of the CND for the $j^{th}$ message, and $L_j$s are the messages that are the input of the check node to which the $k^{th}$ message is directed. For example, when $L_j = L_f$, then the $L_j$s in equation 1 are $L_a$ and $L_c$. As can be seen in equation 1, in the operation of CND 720 the $k^{th}$ input of the check node is not included in the processing of the output $L_k$ of the check node for the $k^{th}$ message (i.e. $j \neq k$). (This makes $L_k$ extrinsic.) So in the example when $L_j = L_f$, then $L_f$ is not used in equation 1. (Note that not including the $k^{th}$ input in the processing of the $L_k$'s output can also be implemented as a subtraction operation.)

The outputs of the CND are deinterleaved in deinterleaver 725 and provided to VND 710. Each of the CND outputs, for example $L'_f$, is supplied to its corresponding variable node, for example 716, i.e. the variable node that was the source of the CND input message that produced this output, for example $L_f$.

VND 710 calculates a posteriori log-likelihood ratio for each of the messages in accordance with equation 2, where $L'_k$ is the output of VND 710 for the $k^{th}$ message.

$$L'_k = L_{in} + \prod_{\substack{j=1, \\ j \neq k}}^{d_{VN}} L'_j \quad (2)$$

where $d_{VN}$ is the degree of the variable node to which the $k^{th}$ message is directed, $L_k$ is the input of the VND for the $k^{th}$ message, $L'_j$s are the messages that are the input of the variable node to which the $k^{th}$ message is directed, and $L_{in}$ is the input of the LDPCC decoder. As can be seen in equation 2, in the operation of VND 710 the $k^{th}$ input of the variable node is not included in the processing of the output, $L'_k$, of the variable node for the $k^{th}$ message (i.e. $j \neq k$). So in the example when $L'_k = L'_f$, then $L'_f$ is not used in equation 2. (Note that not including the $k^{th}$ input in the processing of the $L_k$'s output can also be implemented as a subtraction operation.)

The outputs of VND 710 are interleaved in interleaver 715 and are processed in CND 720. LDPCC decoder 755 is iterative, so the just described operation of the CND and the VND continues for several iterations. After several iterations, the output of VND 710 is provided as the output of LDPCC decoder 755. For further information on LDPCC see, for example, T. J. Richardson, R. L. Urbanke, "The capacity of low-density parity-check codes under message-passing decoding", IEEE Trans. Inform. Theory, vol. 47, no. 2, pp. 599–618, February 2001, incorporated herein by this reference.

FIG. 6 shows receiver 640 that uses an LDPCC decoder in accordance with an embodiment of the present invention. Particularly, the transfer characteristic of CND 720 is matched to the transfer characteristic of combination 650 of MIMO detector 150 and VND 610. In receiver 640, symbols are processed in MIMO detector 150. The resulting soft value bits at the output of the MIMO detector are processed in VND 710. The outputs of VND 710 are interleaved in interleaver 715 and are processed in CND 720. The outputs of CND 720 are deinterleaved in deinterleaver 725 and provided to both VND 710 and VND 730. VND 730 operates in the same manner as VND 710 except VND 730 does not use information provided by MIMO detector 150, i.e. $L_{in}$, but VND 730 does use the input of the variable nodes, i.e. the $L_k$s, in its processing. So, VND 730 calculates a posteriori log-likelihood ratio for each of the messages in accordance with equation 3, where $L''_k$ is the output of VND 730 for the $k^{th}$ message.

$$L''_k = \prod_{j=1}^{d_{VN}} L'_j \quad (3)$$

In the preferred embodiment, VND 710 and VND 730 are a single VND 610 with two outputs 612 and 614. First output 612 is the result of equation 3. This output is supplied to MIMO detector 150. Second output 614 is the result of equation 2. This output is supplied to interleaver 715.

Figure 8:
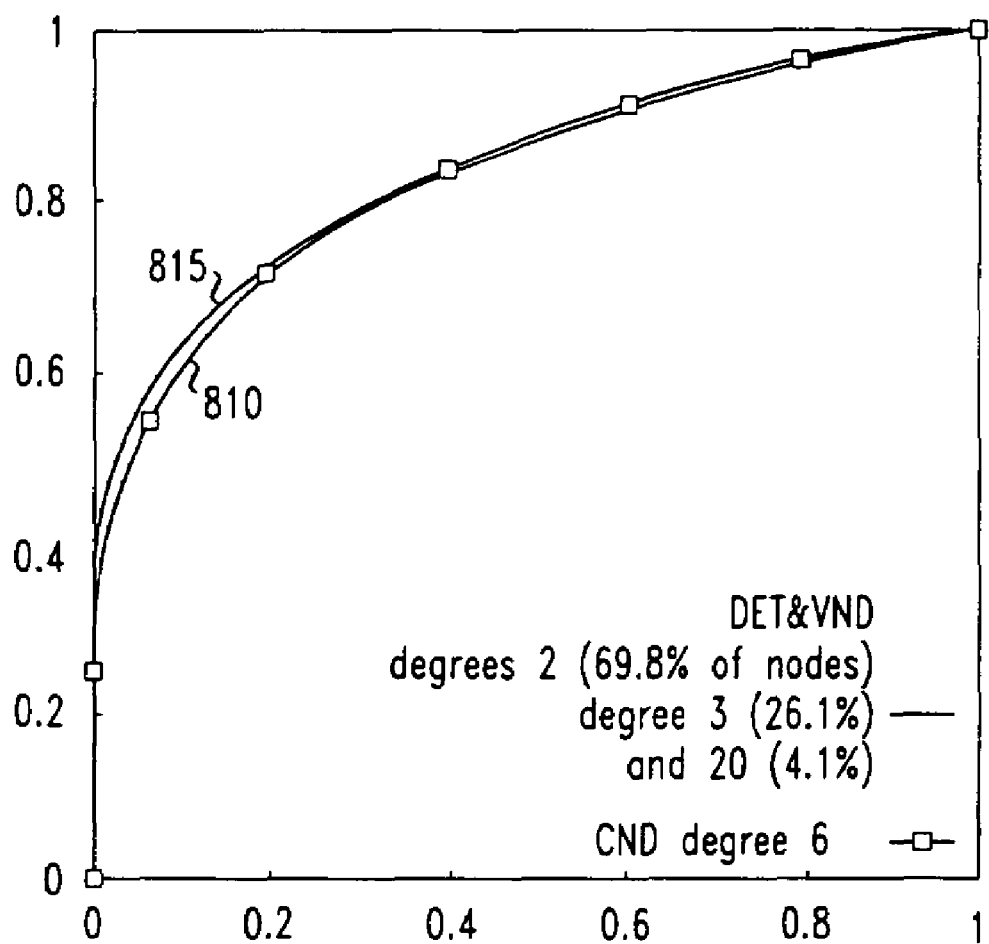
FIG. 8 illustrates, in accordance with an embodiment of the invention, 1) a curve of the transfer characteristic of a combination of a MIMO detector and a VND of a LDPCC decoder, and 2) a reflected transpose of the curve of the transfer characteristic of a CND of a LDPCC decoder.

In accordance with the invention, the degrees of the CND and VND are selected so that the transfer characteristic of CND 720 is matched to the transfer characteristic of combination 650 of MIMO detector 150 and VND 610. FIG. 8 shows curve 810 of the CND and curve 815 of a combination of the MIMO detector and the VND, where the transfer characteristic of the CND is matched to the combination. As can be seen from FIG. 8, curve 815 of the transfer characteristic of the combination is 1) above curve 810 of the transfer characteristic of the channel decoder for about 95% of the curve, and 2) close to, i.e. within a threshold difference of, the reflected transpose of curve 810 of the transfer characteristic of the CND. (The curve of the transfer characteristic of a combination of the MIMO detector and the VND can be obtained by one skilled in the art, for example, in the same manner as the curves of the transfer characteristic described above. For further information on obtaining the curve see, for example, S. ten Brink, "Convergence of Iterative Decoding", Electronic Letters, vol. 35, no. 10, pp. 806–808, May 1999, incorporated herein by this reference.)

An illustrative method of selecting the degrees of CND and VND so that the transfer characteristic of CND 720 is matched to combination 650 is now described with reference to FIGS. 7A and 8. The curve of the transfer characteristics of the MIMO detector is affected by changes in the diversity/multipath characteristics (also referred to as channel characteristics) of the received signal, which is the number of transmitted signals that make up the received signals and the paths these transmitted signals travel to the receiver. The curves of the transfer characteristics of both the MIMO detector and the VND are affected by the signal-to-noise ratio of the received signals. In this illustrative embodiment, the curves are fitted at one selected channel characteristic and one signal-to-noise ratio. In an alternative illustrated embodiment, described below, as the channel characteristics and the signal-to-noise ratio of the received signals changes, the curves can be refitted.

At any particular signal-to-noise ratio, the curve of the transfer characteristic of the VND, and therefore of the combination of the VND and the MIMO detector, starts at the same point on the y-axis, i.e. has the same (0, y) coordinate, regardless of the degree or the combination of degrees of the VND. The signal-to-noise ratio used to start the curve fitting can be any appropriate signal-to-noise ratio, such as a recent normalized or measured, i.e., not normalized, signal-to-noise ratio, the average normalized or measured signal-to-noise ratio, the expected signal-to-noise ratio, the expected normalized signal-to-noise ratio, the expected average signal-to-noise ratio, or the expected average normalized signal-to-noise ratio.

Once the signal-to-noise ratio is selected and the (0,y) coordinate of curve 815 is determined, the degree (or degrees) of the CND is selected. Although the CND can have multiple degrees, it is easier and still effective to select a CND with one degree. The degree of the CND is selected so that the CND's transfer characteristic curve can be fitted to the VND's transfer characteristic curve. The curve of the CND transfer characteristic has a steep increase close to the y-axis. i.e. the values of the y coordinate increase rapidly when the value of the x coordinate is close to zero, and as the CND's degree increases so does the gradient of this curve. The CND degree is selected so that the start of the CND's transfer characteristic curve, i.e. when the x values are close to x=0, for example, 0 to 0.003, this curves y coordinates are below the y coordinate of the (0, y) point of the combination 650's transfer characteristic curve. It is also preferable that the start of CND's transfer characteristic curve is close to VND's transfer characteristic curve, but not so close that it is hard to curve fit without crossing curve 815.

The curve fitting algorithm can be any appropriate curve fitting algorithm whose constraints are 1) to minimize the distance between the two curves and 2) for the reflection of the CND's transfer characteristic curve to be below the combination's transfer characteristic curve for about 95% of the curve. In particular, the curve-fitting algorithm can be provided with equations for the reflection of the CND and the combination. The degree of check nodes is fixed (as selected immediately above) and the degree of the variable nodes is the adjustable parameter. The curve-fitting algorithm can be provided with the option of using any degree in a range (for example any degree between 1 and 50) and curve-fitting algorithm determines which degrees should be used and in what proportion, i.e. what percentage of the nodes should be of a particular degree. (Note, typically, if it is determined by the curve-fitting algorithm that a particular degree should be used in a proportion that is not significant, i.e. one that results in less than one node of a certain degree, that degree can be disregarded.) One curve-fitting algorithm that can be used is the non-linear least-squares Marquardt-Levenberg algorithm tailored to include constraint 2. For more information on the non-linear least-squares Marquardt-Levenberg algorithm see, for example, W. H. Press, S. A. Teukolsky, W. T. Vetterling, B. P. Flannery, Numerical Recipes in C, Cambridge University Press, New York, 1997.

As described above, the transfer characteristic curve can be for a particular channel characteristic and a particular signal-to-noise ratio. In another embodiment of the invention the wireless communication system can dynamically change the channel code used to transmit signals between two devices in the system when the one of these two conditions changes. Particularly, when the channel code is an LDPCC, the degrees of the VND and CND are reselected when the channel characteristics change by more than a certain amount, referred to herein as a channel characteristic threshold. The channel characteristic threshold can be based on many factors, including the symbol duration, block duration, the type of air interface that is used, and the physical environment of the mobile terminal. The channel characteristic threshold can be, for example, a change in the channel characteristics that causes the slope of the curve of the transfer characteristic of the MIMO detector to change by more than 5 degrees or 5 gradients. Additionally (or alternatively), the degrees of the VND and CND can be reselected when the signal-to-noise ratio changes by more than a certain amount, referred to herein as a signal-to-noise ratio threshold. The signal-to-noise ratio threshold can be also be based on a change in the signal-to-noise ratio that causes the slope of the curve of the transfer characteristic of the MIMO detector to change by more than 5 degrees or 5 gradients. The signal-to-noise ratio threshold can be, for example, 4 dB. In such a system, the different LDPCC codes are used at different signal-to-noise ratios.

In another aspect of the invention, the present inventors have recognized a method for adjusting and/or selecting the LDPCCs by matching the transfer characteristics of 1) the CND to 2) the VND. The transfer characteristic of the CND are referred to herein as being matched to those of the VND when the curve of the transfer characteristic of the VND is 1) above the curve of the reflected transpose of the transfer characteristic of the CND for about 95% of the curve, and 2) close to, i.e. within a threshold difference of, the reflected transpose of the curve of the transfer characteristic of the CND. The curve of the transfer characteristic of the CND can be matched to the curve of the transfer characteristic of the VND in same manner as the curve of the transfer characteristic CND is matched to the transfer characteristic of the combination of the MIMO detector and the VND.

The foregoing is merely illustrative and various alternatives will now be discussed. For example, in the illustrative embodiment the system is described as a multi-input, multi-output system having four transmit antennas and two receive antennas. In alternative embodiment, the system can have any number of transmit and/or receive antennas. Furthermore, in alternative embodiments of the invention, the system can be just a multi-input system or a multi-output system.

Although the illustrative embodiment has been explained using a MIMO detector. The LDPCC decoder can be matched to any appropriate type of detector, such as, for example, an equalizer, which detects to reduce intersymbol interference. Particularly, it is possible to decrease the bit error rate of decoded signal by matching 1) the check node decoder (CND) of the LDPCC decoder and 2) the transfer characteristic of a combination of a detector and the variable node decoder (VND) of the LDPCC decoder.

The receiver embodying the principles of the present invention can be used in any part of a wireless communication system in addition, or instead of, the ones shown in the illustrative embodiments. For example, the receiver can be part of a base station, a mobile terminal, a wireless hub of a wireless local area network, a wireless terminal of a local area network, or a fixed wireless network, such as a fixed wireless system set up for communication between two buildings. Furthermore, the mobile terminal can be any type of mobile terminal, such as, for example, a wireless telephone, a laptop, or a personal digital assistant.

Although, the present invention is particularly advantageous when the number antennas at the transmitter is larger than the number of antennas at the receiver, as shown in the illustrative embodiment, the present invention is still advantageous when the number of antenna at the transmitter is less than, or equal to, the number of antennas at the receiver.

The block diagrams presented in the illustrative embodiments represent conceptual views of illustrative circuitry embodying the principles of the invention. Any of the functionally of the illustrative circuitry can be implemented as either a single circuit or as multi circuits. The functionality of multiple illustrative circuitry can also be implemented as a single circuit. Additionally, one or more of the functionalities of the circuitry represented by the block diagrams may be implemented in software by one skilled in the art with access to the above descriptions of such functionality.

In the illustrative embodiment the wireless communication system is a CDMA system. In alternative embodiments the wireless communication system can use other air interface techniques, such as for example, Universal Mobile Telecommunication System (UMTS), Time Division Multiple Access (TDMA), and Global System for Mobile (GSM).

Furthermore, although in the illustrative embodiments, elements are shown as being directly connected to each other, the elements are coupled to each other and additional elements may be coupled between the illustrated elements. As used herein, when elements are referred to herein as being coupled to each other, or are shown as connected to each other, then other elements may be interposed between them, unless it is specifically stated that two elements are directly connected to each other and other element may not be connected between them.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A receiver of a wireless communication device comprising:
    a detector;
    a channel decoder for receiving an output of the detector; and
    wherein a curve of the transfer characteristic of the detector is:
        above a curve of a reflected transpose of the curve of the transfer characteristic of the channel decoder for about 95% of the curve; and
        within a threshold difference of the reflected transpose of the curve of the transfer characteristic of the channel decoder.

2. The invention of claim 1, wherein when the curve of the transfer characteristic of the detector and the curve of the reflected transpose of the curve of the transfer characteristic of the channel decoder are plotted on a scale of 0 to 1, then the threshold difference is 0.05.

3. The invention of claim 1, wherein the detector is a MIMO detector.

4. A receiver of a wireless communication device comprising:
   a detector; and
   a low density parity check code channel decoder having a variable node decoder and a check node decoder; and
   wherein a transfer characteristic of a combination of the detector and the variable node decoder is:
      above a curve of a reflected transpose of the curve of the transfer characteristic of the check node decoder for about 95% of the curve; and
      within a threshold difference of the reflected transpose of the curve of the transfer characteristic of the check node decoder.

5. The invention of claim 4, wherein when the curve of the transfer characteristic of the detector and the curve of the reflected transpose of the curve of the transfer characteristic of the channel decoder are plotted on a scale of 0 to 1, then the threshold difference is 0.05.

6. The invention of claim 4, wherein the detector is a MIMO detector.

7. A method for use in a receiver of a wireless communication device, the receiver having a detector, the method comprising the steps of:
   dynamically selecting a channel decoder based on the detector's transfer characteristic, wherein the selecting step is performed responsive to the channel characteristics of signals received at the receiver changing by a channel characteristic threshold between a first and a second time period; and
   wherein the channel decoder is a low density parity check code channel decoder having a variable node decoder and a check node decoder; and
   the selecting step further comprising:
      selecting a degree of the check node decoder and degrees of the variable node decoder; and
      selecting a channel decoder such that a curve of transfer characteristic of the detector is:
         above a curve of a reflected transpose of the curve of the transfer characteristic of the channel decoder for about 95% of the curve; and
         within a threshold difference of the reflected transpose of the curve of the transfer characteristic of the channel decoder.

8. The invention of claim 7, wherein the selecting step comprises selecting a degree of the check node decoder and degrees of the variable node decoder such that a curve of transfer characteristic of a combination of the detector and the variable node decoder is:
   above a curve of a reflected transpose of the curve of the transfer characteristic of the check node decoder for about 95% of the curve; and
   within a threshold difference of the reflected transpose of the curve of the transfer characteristic of the check node decoder.

9. The invention of claim 8, wherein when the curve of the transfer characteristic of the detector and the curve of the reflected transpose of the curve of the transfer characteristic of the channel decoder are plotted on a scale of 0 to 1, then the threshold difference is 0.05.

10. The invention of claim 7, wherein the detector is a MIMO detector.

11. The invention of claim 7, wherein when the curve of the transfer characteristic of the detector and the curve of the reflected transpose of the curve of the transfer characteristic of the channel decoder are plotted on a scale of 0 to 1, then the threshold difference is 0.05.

12. A transmitter of a wireless communication device for transmitting an encoded signal to a receiver having a detector, the transmitter comprising:
   an encoder adapted to:
      encode a signal using a first channel code responsive to an indication that the detector has a first transfer characteristic; and
      encode the signal using a second channel code, different from the first channel code, responsive to an indication that the detector has a second transfer characteristic, the second transfer characteristic being different than the first transfer characteristic.

13. The invention of claim 12, wherein:
   the first channel code is decodable by a first channel decoder, wherein a curve of the transfer characteristic of the detector is:
      above a curve of a reflected transpose of the curve of the transfer characteristic of the first channel decoder for about 95% of the curve; and
      within a threshold difference of the reflected transpose of the curve of the transfer characteristic of the first channel decoder; and
   the second channel code is decodable by a second channel decoder, wherein a curve of the transfer characteristic of the detector is:
      above a curve of a reflected transpose of the curve of the transfer characteristic of the second channel decoder for about 95% of the curve; and
      within a threshold difference of the reflected transpose of the curve of the transfer characteristic of the second channel decoder.

14. A method for use in a transmitter of a wireless communication system having a receiver having a detector, the method comprising the steps of:
   transmitting a first signal encoded with a first channel code responsive to an indication that the detector has a first transfer characteristic; and
   transmitting a second signal using a second channel code, different from the first channel code, responsive to an indication that the detector has a second transfer characteristic, the second transfer characteristic being different than the first transfer characteristic.

15. The invention of claim 14, wherein:
   the first channel code is decodable by a first channel decoder, wherein a curve of the transfer characteristic of the detector is:
      above a curve of a reflected transpose of the curve of the transfer characteristic of the first channel decoder for about 95% of the curve; and
      within a threshold difference of the reflected transpose of the curve of the transfer characteristic of the first channel decoder; and
   the second channel code is decodable by a second channel decoder, wherein the curve of the transfer characteristic of the detector is:
      above a curve of a reflected transpose of the curve of the transfer characteristic of the second channel decoder for about 95% of the curve; and
      within a threshold difference of the reflected transpose of the curve of the transfer characteristic of the second channel decoder.

* * * * *